United States Patent
Cabouli et al.

(10) Patent No.: US 9,589,405 B2
(45) Date of Patent: *Mar. 7, 2017

(54) SMARTPHONE CONTROLLED BIOMETRIC AND BLUETOOTH ENABLED SMART WALLET SYSTEM

(71) Applicant: iWallet Corporation, San Diego, CA (US)

(72) Inventors: Steven D. Cabouli, San Diego, CA (US); Robert J. Mos, San Diego, CA (US); Clay von Mueller, San Diego, CA (US); Robert A. Lane, Carlsbad, CA (US); Marco A. Schilling, San Diego, CA (US); Paul E. Catinella, San Diego, CA (US)

(73) Assignee: iWallet Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,508

(22) Filed: Dec. 14, 2015

(65) Prior Publication Data

US 2016/0098878 A1     Apr. 7, 2016

Related U.S. Application Data

(63) Continuation-in-part of application No. 14/246,735, filed on Apr. 7, 2014, now Pat. No. 9,224,015.

(51) Int. Cl.
*H04L 29/06* (2006.01)
*G07C 9/00* (2006.01)
(Continued)

(52) U.S. Cl.
CPC ............ *G07C 9/00563* (2013.01); *A45C 1/06* (2013.01); *A45C 13/185* (2013.01); *G06F 21/32* (2013.01);
(Continued)

(58) Field of Classification Search
CPC ........................... G07C 9/00563; G06F 21/34
See application file for complete search history.

(56) References Cited

U.S. PATENT DOCUMENTS

| 4,734,567 A * | 3/1988 | Hansbauer | ......... G06K 13/0806 235/482 |
| 5,841,122 A * | 11/1998 | Kirchhoff | ................ H04B 5/00 235/487 |

(Continued)

*Primary Examiner* — Shawnchoy Rahman
(74) *Attorney, Agent, or Firm* — Richard D. Clarke

(57) ABSTRACT

This application provides an electronic wallet or passport case for controlling the opening, unlocking and locking of enclosures such as luggage, briefcases, lockers, cases, cabinets, vehicles, buildings, homes and with indirect operational control by the means of a smartphone, tablet or any personal computing device. More particularly, a Smartphone Controlled Biometric and Bluetooth Enabled Locking Smart Wallet System is provided. The Smartphone Controlled Biometric and Bluetooth Enabled Locking Smart Wallet System includes a biometric based finger print authentication module, and a Bluetooth communications enabled module, to prevent a non-owner or unauthorized user from accessing the device, along with mobile applications to control the Smart Wallet System using a smartphone. The smart wallet equipped unit may be replaced by any locking case such as a briefcase or luggage.

24 Claims, 12 Drawing Sheets

(51) Int. Cl.
*H04W 4/00* (2009.01)
*H04W 12/06* (2009.01)
*H04W 4/02* (2009.01)
*A45C 1/06* (2006.01)
*A45C 13/18* (2006.01)
*G06F 21/86* (2013.01)
*G07F 17/12* (2006.01)
*H04W 12/08* (2009.01)
*G06F 21/32* (2013.01)
*G06F 21/34* (2013.01)
*G08B 21/24* (2006.01)
*G08B 13/14* (2006.01)

(52) U.S. Cl.
CPC ............. *G06F 21/34* (2013.01); *G06F 21/86* (2013.01); *G07C 9/00309* (2013.01); *G07C 9/00912* (2013.01); *G07F 17/12* (2013.01); *H04L 63/0853* (2013.01); *H04L 63/0861* (2013.01); *H04W 4/008* (2013.01); *H04W 4/02* (2013.01); *H04W 12/06* (2013.01); *H04W 12/08* (2013.01); *G07C 2009/00523* (2013.01); *G07C 2009/00769* (2013.01); *G08B 13/1427* (2013.01); *G08B 13/1436* (2013.01); *G08B 21/24* (2013.01)

(56) References Cited

U.S. PATENT DOCUMENTS

| | | | | |
|---|---|---|---|---|
| 5,987,438 | A * | 11/1999 | Nakano | G06K 7/0013 235/375 |
| 6,111,977 | A * | 8/2000 | Scott | G06K 9/00013 340/5.53 |
| 6,260,300 | B1 * | 7/2001 | Klebes | F41A 17/066 206/317 |
| 6,763,315 | B2 * | 7/2004 | Xydis | G06F 21/35 702/127 |
| 2005/0149741 | A1 * | 7/2005 | Humbel | B60R 25/04 713/186 |
| 2006/0255906 | A1 * | 11/2006 | Ghabra | B60R 25/24 340/5.25 |
| 2006/0273129 | A1 * | 12/2006 | Horn | A45C 13/185 224/587 |
| 2008/0017704 | A1 * | 1/2008 | VanDeburg | G06Q 20/32 235/380 |
| 2008/0148393 | A1 * | 6/2008 | Wendt | G06F 21/32 726/19 |
| 2008/0246587 | A1 * | 10/2008 | Fisher | A47G 29/10 340/5.73 |

* cited by examiner

SMARTPHONE CONTROLLED BIOMETRIC AND BLUETOOTH ENABLED SMART WALLET SYSTEM

FIELD OF THE INVENTION

This application provides an electronic wallet or passport case for controlling the opening, unlocking and locking of enclosures such as luggage, briefcases, lockers, cases, cabinets, vehicles, buildings, homes and with indirect operational control by the means of a smartphone, tablet or any personal computing device. More particularly, a Smartphone Controlled Biometric and Bluetooth Enabled Locking Smart Wallet System is provided.

BACKGROUND OF THE INVENTION

The present invention pertains generally to a wide variety of wallets, passport cases, briefcases and enclosures with improved security features. More specifically, the present invention pertains to systems and methods for securing enclosures such as luggage, briefcases, lockers, cases, cabinets, vehicles, buildings, homes, and the like, while employing electronic features communicating, with a smart phone, tablet or a computer. The present invention is particularly useful as a method for controlling locking and unlocking with advanced features including biometric authentication and an ability to transmit and receive electronic signals through various means.

In an age where electronic devices and transactions are prevalent, safe-guarding data within enclosures such as luggage, briefcases, lockers and cabinets has become an important issue, thus giving rise to a myriad of security systems. Two of the common security systems used are, password and personal identification (PIN) systems. Password systems require a user to provide the authentication system with a username and a password (both of which are unique to the user). PIN systems on the other hand usually require a user to provide a code, usually referred to as the PIN code, for authentication purposes. Both the password and the PIN system can prove to be a nuisance to users in the event they forget their password or PIN code. Moreover, a user A can easily impersonate another user B if user A happens to get a hold of the password or PIN code (given either voluntarily or exploited through other means) of user B. One way to avoid such breaches of security is to implement a user-based physiological or behavioral characteristic as a means for authentication. This is the general idea behind biometrics.

Biometrics is the study of measurable biological characteristics. In computer security, biometrics refers to authentication techniques that rely on measurable physiological (e.g. face, fingerprint, hand, iris, or DNA) or behavioral (e.g. keystrokes, signature, or voice) characteristics that can be automatically checked.

In the above description, authentication is usually accomplished via a biometric device. A general description of the functionality of a biometric device now follows. First, the biometric device captures a profile of the characteristic and next, a comparison of the acquired profile is made with a stored profile or template. Lastly, upon successful matching of the captured and stored profile, the user is interfaced with the application system requesting authentication.

Authentication based on fingerprint: One of the most common biometric techniques is the fingerprint, wherein users scan in a copy of their fingerprint and a comparison is performed by the authentication device as to whether or not the input fingerprint matches that of a stored fingerprint corresponding to the same person. Some fingerprint authentication devices further provide a step of checking for a pulse to combat problems posed by false-authentication via fingerprints that are not real.

Authentication based on hand geometry captures the physical characteristics of a user's hand and fingers via a scanner and is matched with a stored template of the same user. Upon successful authentication, an action (like opening a secure door) is performed by the querying system.

Therefore, biometrics is beginning to play a critical role in authentication and security. Biometrics authenticate the user not based on what he can remember (like passwords, PIN's, etc.), but rather use the user's characteristics (or who the user is) to perform authentication.

Also recently, improvements in electronic tracking and inventory systems have been proposed that take advantage of the latest short range, low power technologies such as Bluetooth and ZigBee. However, no similar proposals have been made that specifically address enclosures such as luggage, briefcases, lockers and cabinets as in the smartphone controlled biometric and Bluetooth enabled locking Smart wallet application, providing biometric authentication and electronic tracking.

SUMMARY OF THE INVENTION

In this respect, before explaining at least one embodiment of the Smartphone Controlled Biometric and Bluetooth Enabled Locking Smart Wallet System in detail it is to be understood that the design is not limited in its application to the details of construction and to the arrangement, of the components set forth in the following description or illustrated in the drawings. The Smartphone Controlled Biometric and Bluetooth Enabled Locking Smart Wallet System is capable of other embodiments and of being practiced and carried out in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present design. It is important, therefore, that the claims be regarded as including such equivalent construction insofar as they do not depart from the spirit and scope of the present application.

The principle advantage of the Smartphone Controlled Biometric and Bluetooth Enabled Locking Smart Wallet System is that it provides a unique apparatus for locking enclosures such as luggage, briefcases, cases, lockers, cabinets, vehicles, buildings, homes and the like with indirect operational control by the means of a smartphone, tablet or any personal computing device.

Another advantage of the Smartphone Controlled Biometric and Bluetooth Enabled Locking Smart Wallet System is that it contains a biometric based authentication module to prevent a non-owner from accessing the device. Biometrics authenticate the user not based on what he can remember (passwords, etc.), but rather employ the user's characteristics (through fingerprints, etc.) to perform authentication.

Another advantage of the Smartphone Controlled Biometric and Bluetooth Enabled Locking Smart Wallet System is that it contains a Bluetooth communications enabled based authentication module to prevent a non-owner from accessing the device and provides a secure case or enclosure that is tamper resistant.

Another advantage of the Smartphone Controlled Biometric and Bluetooth Enabled Locking Smart Wallet System is that it provides a secure case or enclosure with electronic transmission and receiving capability, for example, triggering an alarm indication when the case or enclosure are taken out of a user's preselected range.

Another advantage of the Smartphone Controlled Biometric and Bluetooth Enabled Locking Smart Wallet System is that it will provide a secure case or enclosure with a USB port so that data can be retrieved, stored and programmed to the device via a personal smart phone or laptop computer.

Another advantage of the Smartphone Controlled Biometric and Bluetooth Enabled Locking Smart Wallet System is that it will provide a secure case locking system and method that is simple to use, yet easy to implement and cost effective.

The Smartphone Controlled Biometric and Bluetooth Enabled Locking Smart Wallet System provides a unique apparatus for locking enclosures such as luggage, briefcases, lockers and cabinets with indirect operational control by the means of a smart phone, tablet or a computer. The Smartphone Controlled Biometric and Bluetooth Enabled Locking Smart Wallet System is provided having relatively low power, relatively short range, and wireless transmission capability. The Smartphone Controlled Biometric and Bluetooth Enabled Locking Smart Wallet System can be unlocked or locked at any distance within the range of the cell phone or smartphone. The Smartphone Controlled Biometric and Bluetooth Enabled Locking Smart Wallet System is still further configured so that when it is separated by a predetermined distance, for example ten (10) feet, the Smartphone Controlled Biometric and Bluetooth Enabled Locking Smart Wallet System will provide audio and/or vibrational indication to both the Smartphone Controlled Biometric and Bluetooth Enabled Locking Smart Wallet System and the smartphone. The audio indication principle purpose is to alert an owner when the Smartphone Controlled Biometric and Bluetooth Enabled Locking Smart Wallet System has been stolen or lost.

In a preferred embodiment, a biometric reader is realized as fingerprint module with a microprocessor that controls the actions of the range detection, for example with sound generator and vibrator, and also with authentication of the user via the fingerprint module. A Security Parameter Index (SPI) is associated with a Smartphone Controlled Biometric and Bluetooth Enabled Locking Wallet System owner's biometric signature. Microprocessor communicates to the wireless module which includes an antenna, via a General Purpose Input/Output (GPIO). It is preferred that both processor and wireless module are low power consuming and concurrent with the latest advancements in such electronics. Further, the wireless module is configured, according to for example, short range low power protocols as defined by either Bluetooth, ZigBee (IEEE 802.15.4), Radio Frequency Identification (RFID), or Ultra-Wideband (UWB).

The present design comprises applications including registration, login, authentication, range detection, remote open, and remote authentication status utilizing the operating systems wireless stack, security library, biometric middleware, and device drivers. The operating system includes all the services such as interprocess communications, memory management, clock, and file system. Device drivers include wireless, flash, I/O ports, timers, fingerprint reader, and others. Sitting on top of the OS are the wireless communication stack, biometric library (middleware), and security library. The application layer includes applications such as sync, user registration, user authentication, and range detection, for example.

In the Smartphone Controlled Biometric and Bluetooth Enabled Locking Smart Wallet System a biometric reader is configured to scan a fingerprint of a person attempting to access the Smartphone Controlled Biometric and Bluetooth Enabled Locking Smart Wallet System. The LED is designed to emit green when processor recognizes the fingerprint as the owner. Also, a chime is emitted from sound generator when a successful authentication is received. Additionally, the LED is designed to emit red light, and sound generator will emit a warning buzzer, when the biometric reader scans a fingerprint other than what the processor recognizes as the owner. Still further, the LED is designed to emit amber light when battery power for the Smartphone Controlled Biometric and Bluetooth Enabled Locking Smart Wallet System is below threshold level and also sound generator will emit an intermittent beeping sound.

In a preferred embodiment, recharging of the battery power can be achieved via the mini USB port to a charger that plugs into an AC power supply. Alternatively, a separate port for an AC adapter can be provided as a design choice. Alternatively, a wireless induction charging adapter, which the Smartphone Controlled Biometric and Bluetooth Enabled Locking Smart Wallet System is placed on during the night to automatically charge while the user is asleep, can be provided as a design choice.

With respect to the above description then, it is to be realized that the optimum dimensional relationships for the parts of this application, to include variations in size, materials, shape, form, function and manner of operation, assembly and use, are deemed readily apparent and obvious to one skilled in the art. All equivalent relationships to those illustrated in the drawings and described in the specification intend to be encompassed by the present disclosure. Therefore, the foregoing is considered as illustrative only of the principles of the Smartphone Controlled Biometric and Bluetooth Enabled Locking Smart Wallet System. Further, since numerous modifications and changes will readily occur to those skilled in the art, it is not desired to limit the design to the exact construction and operation shown and described, and accordingly, all suitable modifications and equivalents may be resorted to, falling within the scope of this application.

The Bluetooth enabled device which the Smartphone Controlled Biometric and Bluetooth Enabled Locking Smart Wallet System communicates with can be a custom dongle or part of a commercial off the shelf (CTOS) device that is paired with the Smartphone Controlled Biometric and Bluetooth Enabled Locking Smart Wallet System after purchase. It can be seen that any radio frequency (RF) transmission capable device, matching the RF format employed in the RF enabled Smartphone Controlled Biometric and Bluetooth Enabled Locking Smart Wallet System, is suitable for operation and may take many forms, not limited to a cell phone, a door access control lock, and a vehicle access control system.

BRIEF DESCRIPTION OF THE DRAWINGS

The accompanying drawings, which are incorporated in and form apart of this specification, illustrate embodiments of the Smartphone Controlled Biometric and Bluetooth Enabled Locking Smart Wallet System and together with the description, serve to explain the principles of this application.

For a fuller understanding of the nature and advantages of the Smartphone Controlled Biometric and Bluetooth Enabled Locking Smart Wallet System, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Figure 1:
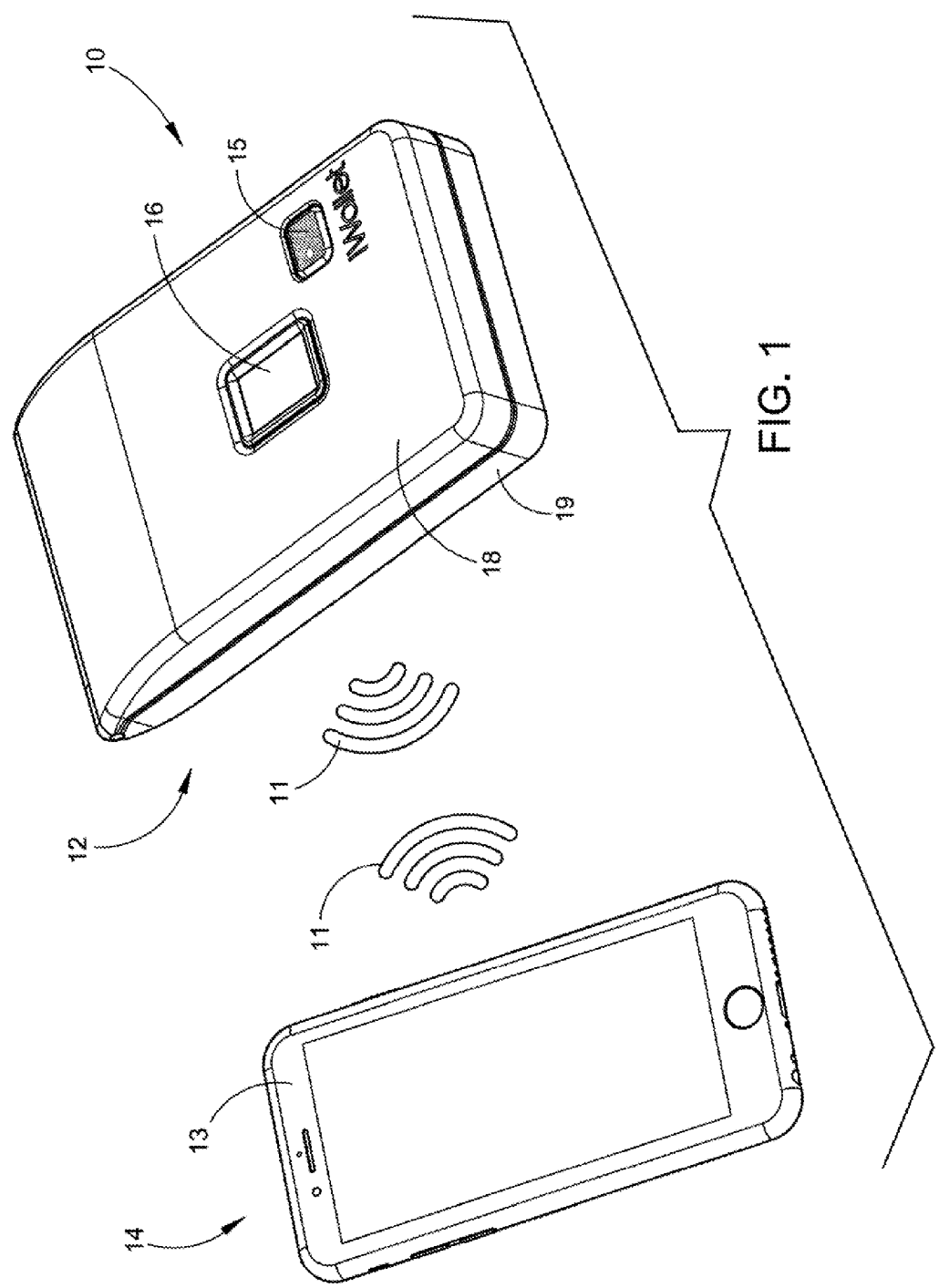
FIG. 1 depicts a perspective view of a typical Smartphone controlled Biometric and Bluetooth Enabled Locking Smart Wallet System and a smartphone, paired using any one of a number of radio frequency (RF) connection means.

Referring now to the drawings, wherein similar parts of the Smartphone Controlled Biometric and Bluetooth Enabled Locking Smart Wallet System 10 are identified by like reference numerals, there is seen in FIG. 1 a perspective view of a typical Smartphone Controlled Biometric and Bluetooth Enabled Locking Smart Wallet System 10 including a smart wallet 12 and a smartphone 14 which have been paired and are in electronic communication using one of many varying radio frequency means.

In this FIG. 1 perspective view of the Smartphone Controlled Biometric and Bluetooth Enabled Locking Smart Wallet System 10 configuration, there is illustrated the smart wallet 12 having a main ON/OFF button 15, a finger print sensor 16 that when the correct user's finger print is recognized, the smart wallet 12 is unlocked, whereby the top latch link 18 and the bottom latch link 19 are retracted to open the smart wallet 12 and reveal the contents inside. Using an application stored on the smartphone 14 and viewed on the smartphone screen 13, the Smartphone Controlled Biometric and Bluetooth Enabled Locking Smart Wallet System 10 can be controlled with respect to security information stored on the smart wallet 12 and the smartphone 14, and through communications passed between them using a WiFi or Bluetooth connection 11.

Figure 2:
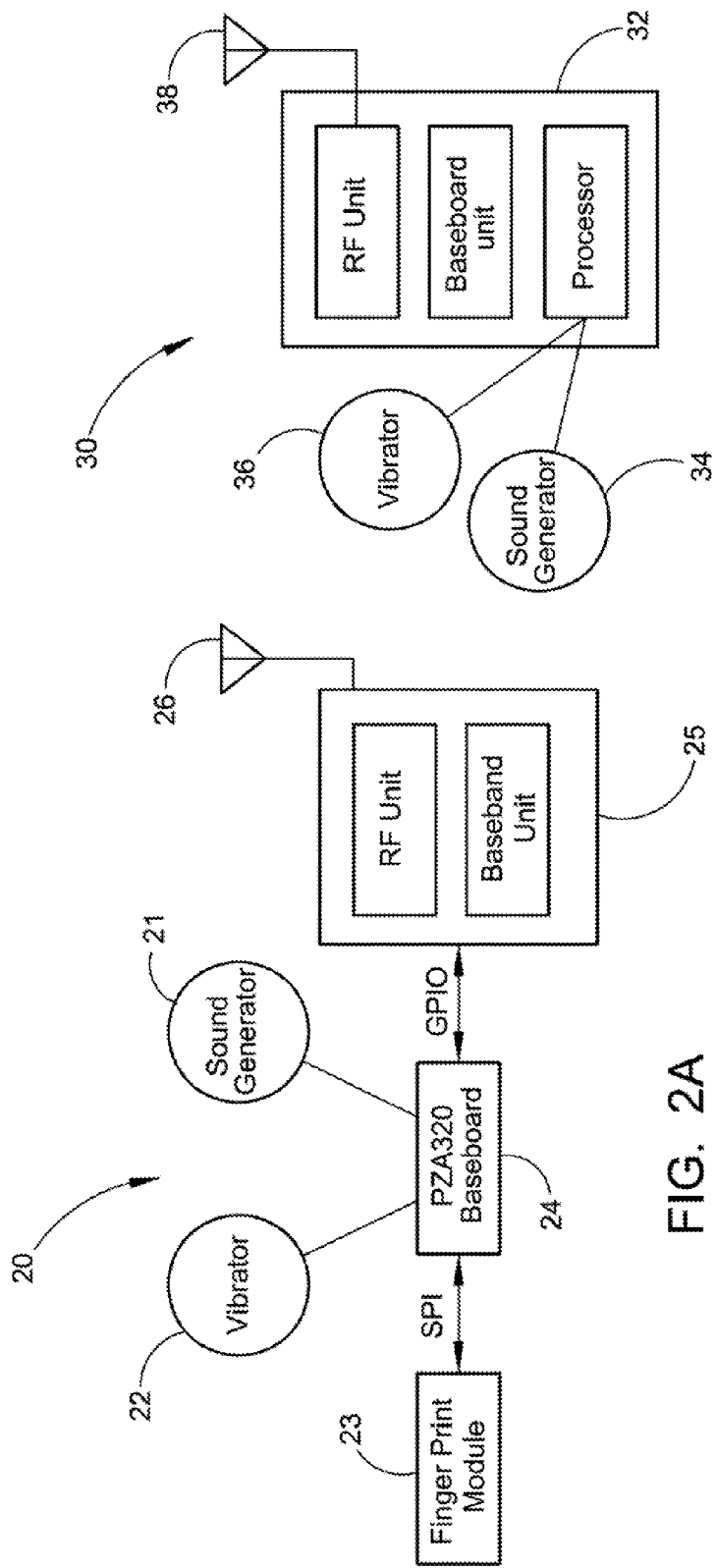
FIG. 2A illustrates a block diagram for hardware components for a Smartphone Controlled Biometric and Bluetooth Enabled Locking Smart Wallet System according to the present invention.
FIG. 2B illustrates a block diagram for hardware components of a smartphone for the Smartphone Controlled Biometric and Bluetooth Enabled Locking Smart Wallet System of the present invention.

Referring to FIG. 2A, a block diagram 20 of exemplary hardware components for the Smartphone Controlled Biometric and Bluetooth Enabled Locking Smart Wallet System 10 is shown. In a preferred embodiment, a biometric leader is realized as fingerprint module 23. Microprocessor 24 controls the actions of the range detection, for example with sound generator 21 and vibrator 22, and also with authentication of the user via the fingerprint module 23. A Security Parameter Index (SPI) is associated with a wallet owner's biometric signature. Microprocessor 24 communicates to wireless module 25 via a General Purpose Input/Output (GPIO), for example, and includes antenna 26. It is preferred that both processor 24 and wireless module 25 are low power consuming and concurrent with the latest advancements in such electronics. Further, wireless module 25 is configured, according to for example, short range low power protocols as defined by either Bluetooth, WiFi, ZigBee (IEEE 802.15.4), Radio Frequency Identification (RFID), Z-Wave, or Ultra-Wideband (UWB).

FIG. 2B illustrates a smartphone hardware block diagram 30 for the Smartphone Controlled Biometric and Bluetooth Enabled Locking Smart Wallet System 10, wherein a microprocessor 32 is integrated with a wireless module. Similarly, the integrated processor and wireless module 32 control sound generator 34 and vibrator 36, and is electronically connected to antenna 38.

Figure 3:
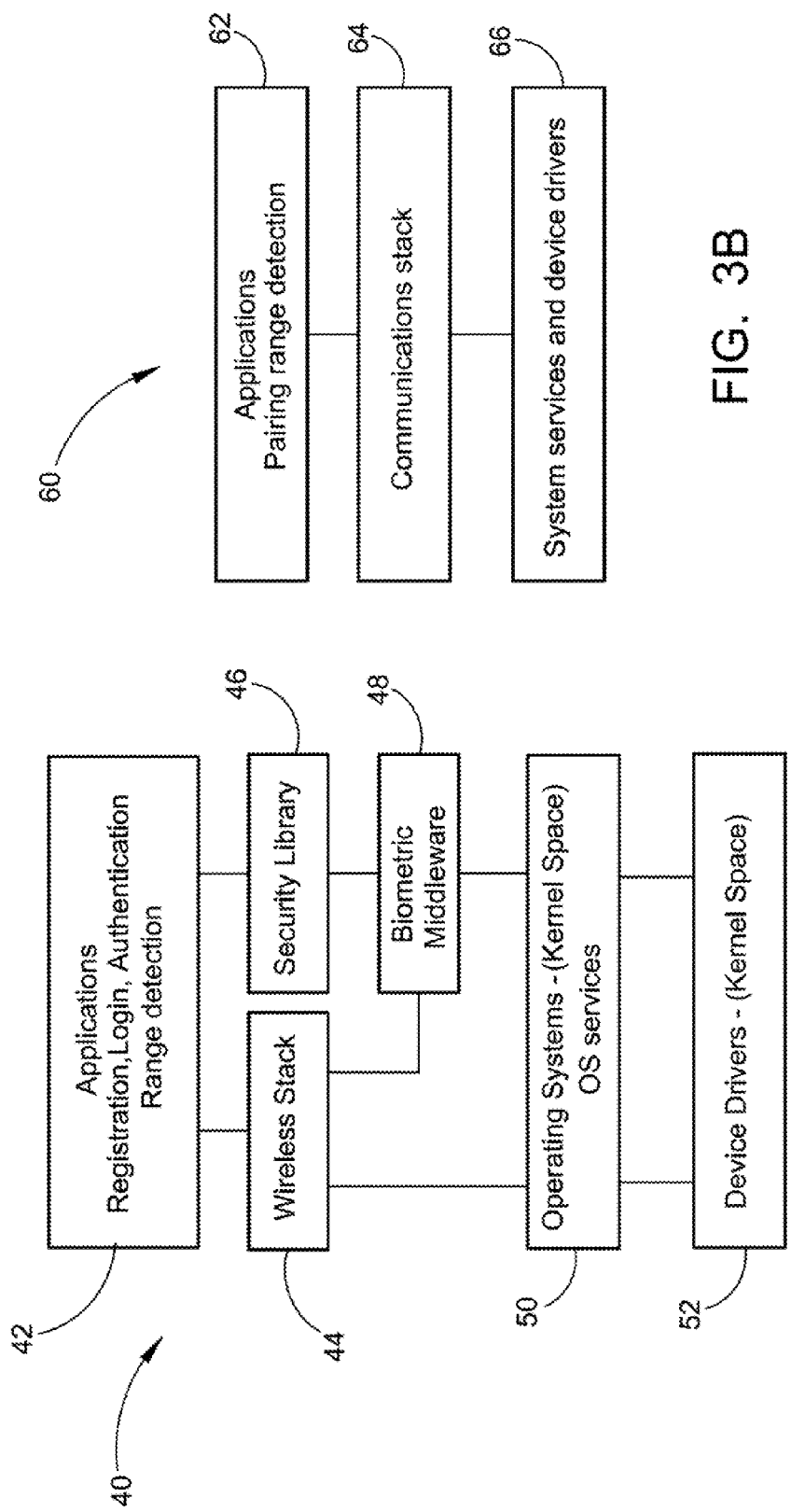
FIG. 3A illustrates a block diagram for software components for a Smartphone Controlled Biometric and Bluetooth Enabled Locking Smart Wallet System of the present invention.
FIG. 3B illustrates a block diagram for software components for a Smartphone Controlled Biometric and Bluetooth Enabled Locking Smart Wallet System of the present invention.

FIG. 3A shows software block diagram 40 for the smart wallet 12 component within the Smartphone Controlled Biometric and Bluetooth Enabled Locking Smart Wallet System 10 of the present invention. This software component block diagram 40 includes application layer modules such as a registration, login, authentication, range detection module 42, a wireless stack 44, a security library 46, a biometric middleware module 48, an operating system 50, and device drivers 52. The operating system 50 includes all the services such as interprocess communications, memory management, clock, and file system. Device drivers 52 include wireless, flash, I/O ports, timers, fingerprint reader and others. Sitting on top of the OS 50 are the wireless communication stack 44, biometric library (middleware) 48, and security library 46. The application layer 42 includes applications such as sync, user registration, user authentication, and range detection, for example.

FIG. 3B illustrates software block diagram 60 for the smartphone component 14 within the Smartphone Controlled Biometric and Bluetooth Enabled Locking Smart Wallet System 10 of the present invention. The smartphone software block 60 comprises applications including pairing and range detection 62, communications stack 64, system services and device drivers 66. Software on the electronic smartphone 14 is simpler than software on the smart wallet 12. According, no full featured operating system is provided but instead a simple round-robin loop, where each software module, pairing and range detection 62, communications stack 64 and system services and device drivers 66 is given a time slice of a CPU.

Figure 4:
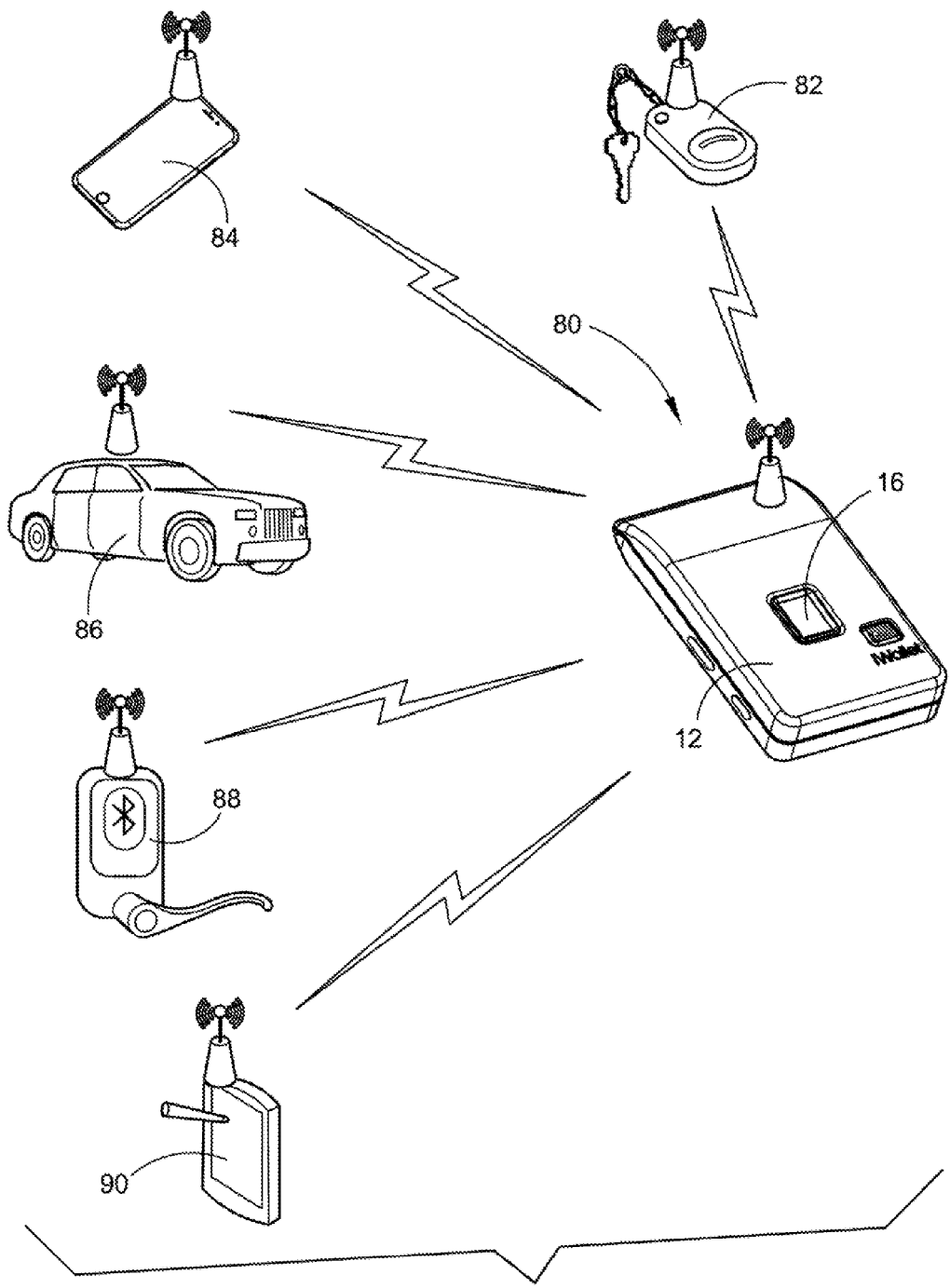
FIG. 4 illustrates how a Smartphone Controlled Biometric and Bluetooth Enabled Locking Smart Wallet System can pair with, and communicate with various devices, to enable control of the locking and unlocking of those various devices.

FIG. 4 depicts a block diagram illustration of hardware and radio frequency connected components 80 for the Smartphone Controlled Biometric and Bluetooth Enabled Locking Smart Wallet System 10 of the present invention. Possible RF connections include: connection to a (key FOB) dongle 82, connection to a cell phone or smartphone 84, connection to an automobile access control system 86, connection to a building or home door lock 88, and connection to a mobile computing device 90 to the Smartphone Controlled Biometric and Bluetooth Enabled Locking Smart Wallet System 10.

While the Smartphone Controlled Biometric and Bluetooth Enabled Locking Smart Wallet System 10 (RF) link is active, devices within the transmission range can monitor for and establish a connection with the Smart Wallet 12. When a link is established the connecting device can be interrogated and ascertain the type of device which it is connected to Smart Wallet 12 and the connected devices capabilities. In the case of a connection with a (key FOB) dongle 82, the two devices pair and monitor for device separation. If separation greater than a preset level is detected audible and visual alarms are sounded.

In the case of a connection with a smartphone or cell phone 84 or a mobile computing device 90 the two devices pair and a preinstalled application is loaded on the device providing enhanced capabilities, including setting the alarm range detection, sounding an alarm on the Smart Wallet 12 for finding a lost device within the transmission radius, a remote open function and a battery level monitoring function. In the case of a connection with a vehicle 86, the vehicle authenticates that the Smart Wallet 12 is authorized to access the vehicle, and if granted unlocks the door and enables the ignition system.

In the case of a connection with a access control door lock 88, the door lock authenticates that the Smart Wallet 12 is authorized to access the seemed area, and if granted, activates the door lock open mechanism. In all of the above cases, if preconfigured, the pairing operation can also include a successful biometric authorization in addition to the described pairing operation to gram access to the paired devices protected operations within the Smartphone Controlled Biometric and Bluetooth Enabled Locking Smart Wallet System 10.

Figure 5:
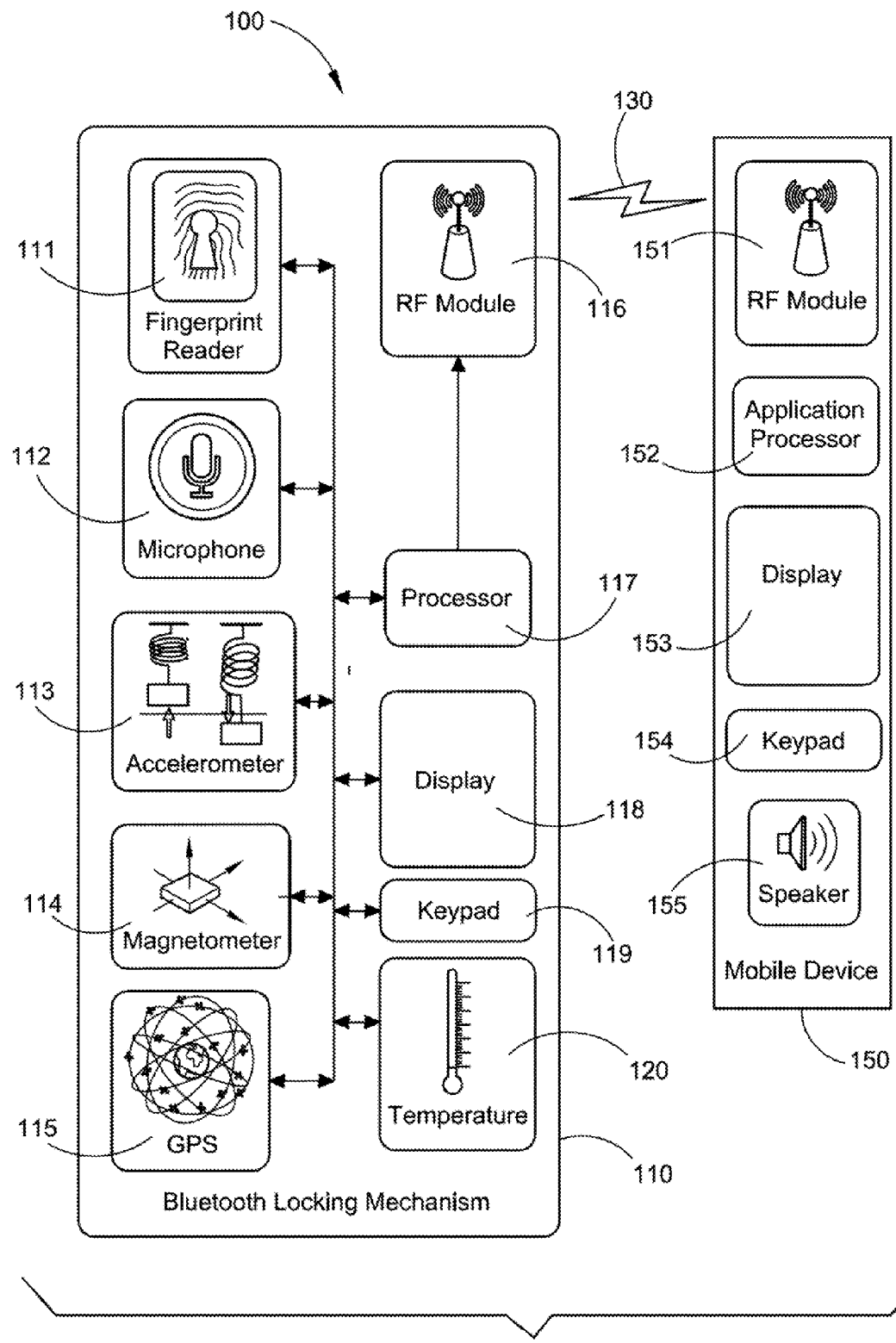
FIG. 5 depicts a block diagram illustration of the Smartphone Controlled Biometric and Bluetooth Enabled Locking Smart Wallet System having a radio frequency (RF) connection to multiple hardware and software components for the system.

FIG. 5 depicts a block diagram illustration of the Smartphone Controlled Biometric and Bluetooth Enabled Locking Smart Wallet System 100 having a radio frequency (RF) connection to multiple hardware and software components for the system. Referring now to FIG. 5 in detail, there is illustrated a functional design for a Smartphone Controlled Biometric and Bluetooth Enabled Locking Smart Wallet System Bluetooth locking system 110, connected via a wireless connection 130, to any of a variety of mobile devices 150, including all of those examples shown in FIG. 4 above. In this regard, referring now to FIG. 5 the following outline of operations provides a functional design for a smartphone Controlled Biometric and Bluetooth Enabled Locking Smart Wallet System 110 connected to any mobile device 150. As previously described the mobile device 150 is one of a variety of devices which are enabled to communicate over a wireless connection 130 with a Smartphone Controlled Biometric and Bluetooth Enabled Locking Smart Wallet System 110. Any smartphone mobile device 150 would include the RF Module 151, an Application Processor 152, as Display 153, a Keypad 154 and a Speaker 155, as shown.

Figure 6:
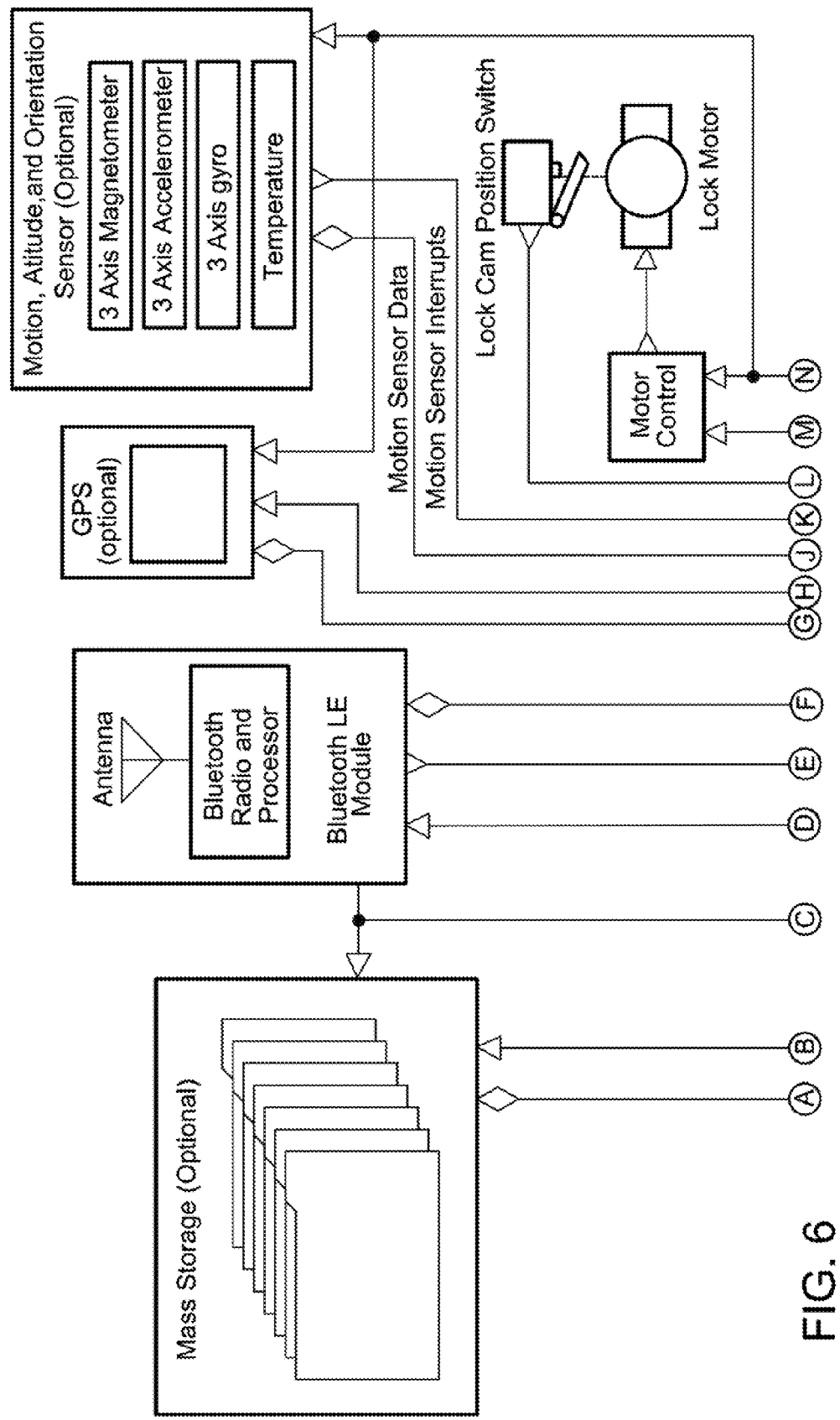
FIG. 6 depicts a block diagram illustration of the system for securing the Smartphone Controlled Biometric and Bluetooth Enabled Locking Smart Wallet System, including the motor control, lock, Bluetooth antenna and Bluetooth module as well as optional mass storage, GPS and motion sensor.

FIG. 6 depicts a block diagram illustration of the system components for the Biometric and Bluetooth Enabled Case Lock assembly including the motor control, lock. Bluetooth antenna and Bluetooth module as well as optional mass storage, GPS and motion sensor.

Figure 7:
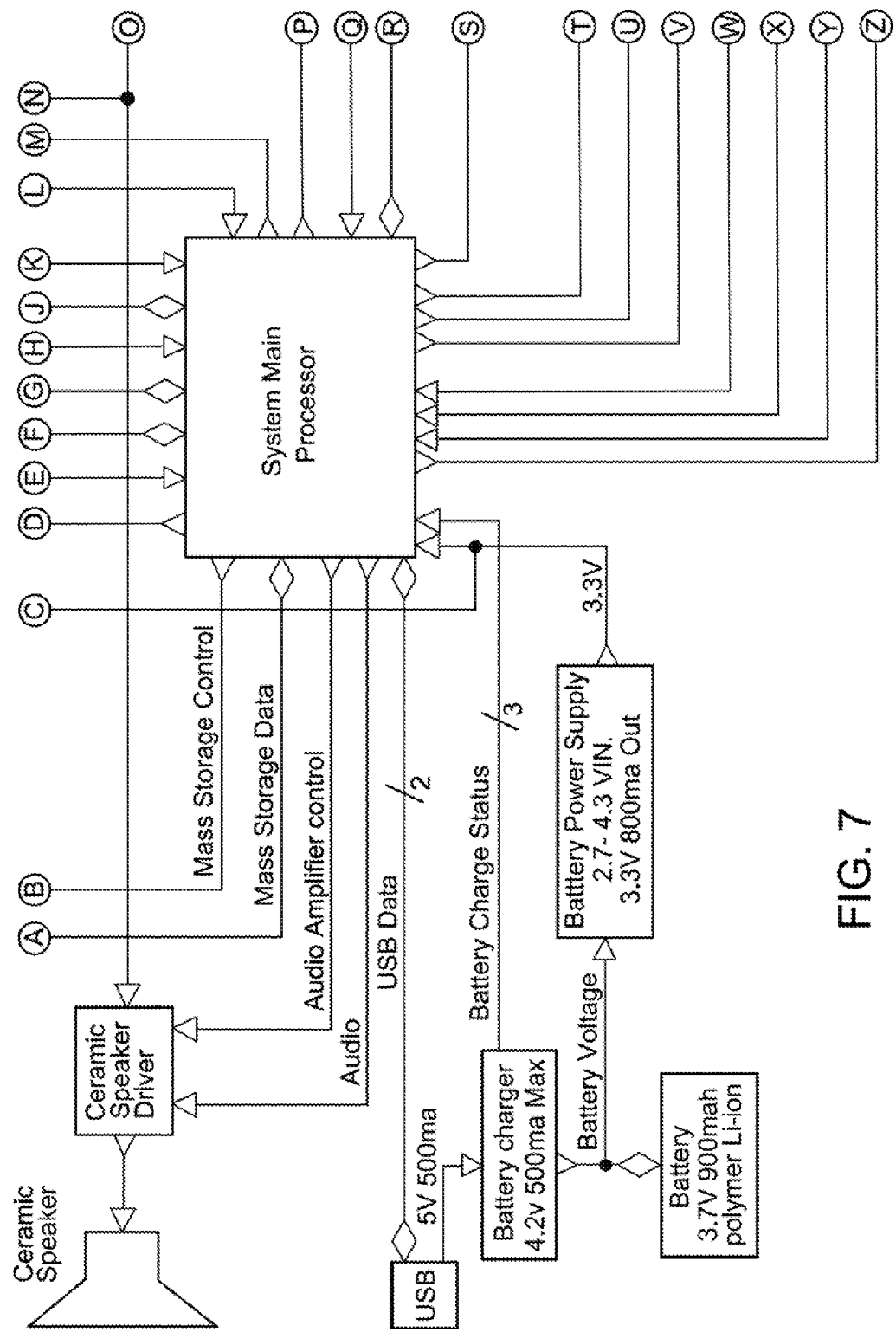
FIG. 7 depicts a block diagram illustration of the hardware components for the Smartphone Controlled Biometric and Bluetooth Enabled Locking Smart Wallet System assembly, including the main processor, speaker driver and speaker, as well as the USB port and battery power supply configurations.

FIG. 7 depicts a block diagram illustration of the hardware components for the Biometric and Bluetooth Enabled Case Lock assembly, including the main processor, speaker driver and speaker, as well as the USB port and battery power supply configurations.

Figure 8:
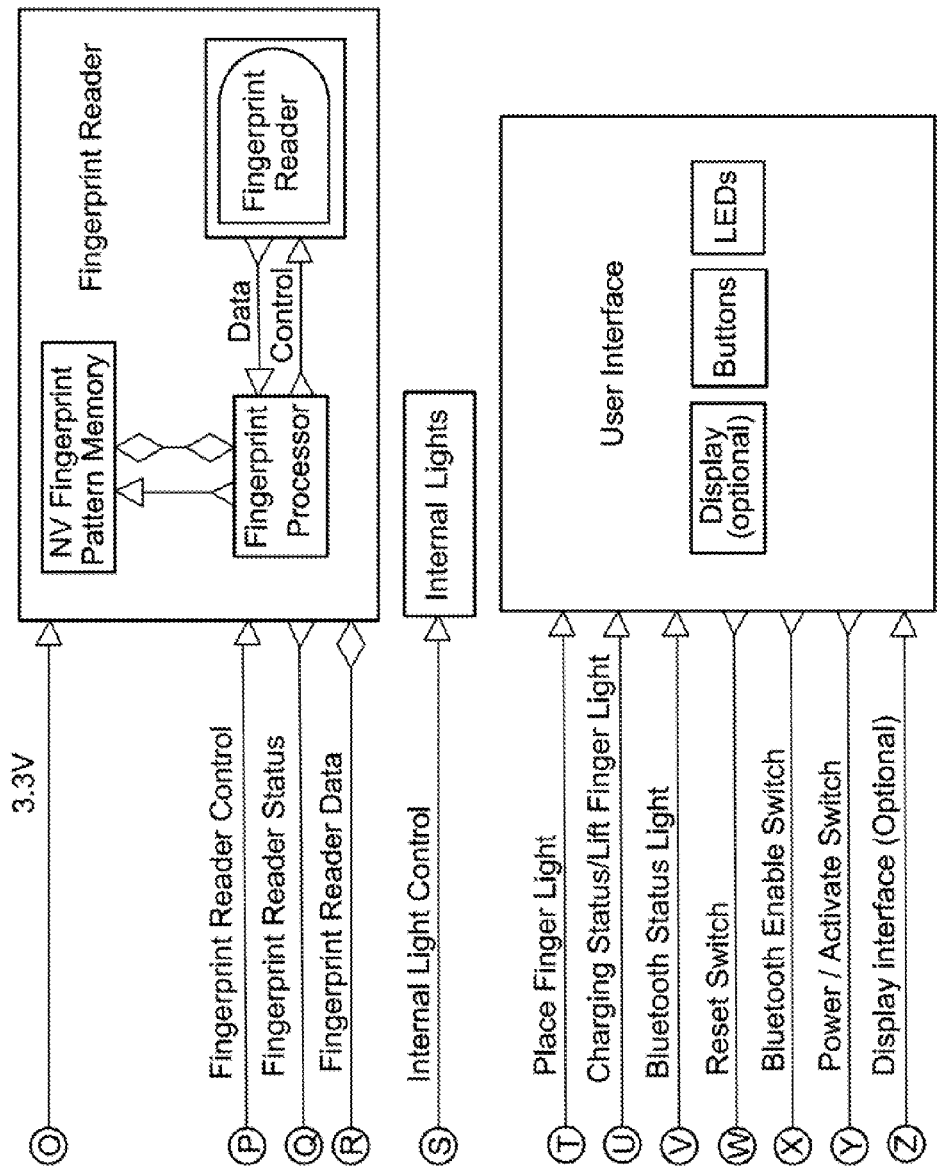
FIG. 8 depicts a block diagram illustration of the hardware and software components for the Smartphone Controlled Biometric and Bluetooth Enabled Locking Smart Wallet System assembly, including the fingerprint reader, internal lights and user interface.

FIG. 8 depicts a block diagram illustration of the hardware components for the Biometric and Bluetooth Enabled Case Lock assembly, including the fingerprint reader, internal lights and user interface.

Referring now to FIG. 5, and FIGS. 6, 7 and 8, the following outline provides a hardware design for a Smartphone Controlled Biometric and Bluetooth Enabled Locking Smart Wallet System 10 with all optional equipment included. Items listed as 'standard equipment' will be included on all Smartphone Controlled Biometric and Bluetooth Enabled Locking Smart Wallet System 10 product designs. Items listed as 'optional equipment' may be included or omitted in any combination in a specific design as may be required by a final product specification definition.

The System Processor 117 (standard equipment) controls the overall operation of the Smart Wallet: System 110 unit. For example, the following operations are facilitated by the System Processor:

a. Interprets the user's inputs and convert them into commands which control the fingerprint enrollment and identification process.
b. Controls lock motor and monitors lock motor position feedback operation.
c. Controls and interprets commands passed from the user's external Bluetooth device.
d. Manages system power usage.
e. Controls the operation of all LED's (Status LEDs and Hood Light).
f. Monitors and records motion sensor data.
g. Monitors and records temperature sensor readings.
h. Manages the Real Time Clock for time-lock and alarm operation.
i. Supports USB communication for direct connect setup and firmware updating.
j. Monitors the battery voltage and reports battery status via status LEDs and Bluetooth.
k. Optionally monitors and records GPS Data.
l. Microphone input for voice controlled operation.

The Bluetooth LE RF Module (standard equipment) 116 controls the Bluetooth radio link to the users' smartphone or other compatible intelligent device 150. It also receives commands and alerts from the external device 150 and passes them to the System Processor 117 for action. Additionally RF Module 116 receives command and control data from the System Processor 117 and passes that data to the external device 150 via the Bluetooth link throe the mobile device RF Module 151.

The Fingerprint Sensor (standard equipment) 111 is the device on which the users places their finger to enroll a finger or to unlock the device.

A Fingerprint Compressor (standard equipment) receives commands from the System Processor and then controls the operation of the fingerprint sensor.

A USB interface (standard equipment) is used both to provide charging power for the battery and to control and setup the device with the individual user preferences and also allows reading the mass storage memory if equipped.

The Battery (standard equipment) provides all power to the system during normal operation.

A Power Supply (standard equipment) will serve to provide the system with the regulated voltages that are required for the system to operate.

The Battery Charger (standard equipment) provides controls and monitors the battery charge cycle when the unit is plugged into a USB port or USB wall charger.

Numerous Status LEDs (standard equipment), and custom display (optional equipment) 118 are used to convey unit status and also to prompt the user to perform some action like placing a linger on or lifting a finger from the fingerprint touch sensor. The functioning of these varying color status LEDs and custom display may be as follows:
  a. A Green LED blinks slowly when battery is charging and is on solid when the battery is fully charged. One long blink indicates user should place their finger on the fingerprint sensor. Green LED is off when in standby mode.
  b. A Red LED flickers at a slow rate to indicate the battery is in need of charging. One long blink indicates the user should lift their finger from the fingerprint sensor. Red LED is off when in standby mode.
  c. A Blue LED conveys the current state of the Bluetooth link.

An Internal Lighting (standard equipment) can be used, and may be configured in the form of an illuminated frame around the case. These lights illuminate the contents of the case momentarily when opened in low light conditions.

A Lock Status Switch (standard equipment) signals the main processor when the Lock Motor has completed the full Unlock/Relock cycle.

An Activate/Power Button (standard equipment) powers the unit on if it is off and requests the user to input a fingerprint to unlock the unit. If the unit is already on or in standby mode the unit will just request that the user inputs a fingerprint to unlock the unit.

The Bluetooth Enable Button (standard equipment) is used to enable and disable the Bluetooth link to the user's external device.

A Reset Button (standard Equipment) is used to reset the system. The reset button is accessed via a small diameter hole somewhere on the device. The button is activated by inserting the tip of a paperclip straight into the hole until it clicks. This is used to restart the main processor in the event of trouble. The unit will restart with all previous settings intact. An alarm will sound for a few seconds and the user will be prompted to place their finger on the fingerprint reader.

A Lock Motor Control (standard equipment) provides power to the Lock Motor when requested by the System Processor.

The Lock Motor (standard equipment) is an electromechanical device which unlocks and relocks the unit.

An Alarm Amplifier (standard equipment) is present within the system. It Amplifies the low power audio signals from main processor to the high power signal required by the alarm speaker.

The Alarm Speaker (standard equipment) provides the sounds which alert the user about a status change of the device, or other alarms which may require their attention.

A WiFi Connectivity (optional equipment) module 116 allows longer distance control, access a id monitoring of the unit through WiFi communications.

A GPS Sensor (optional equipment) 115 allows global position information to be monitored and recorded. The GPS Sensor 115 also allows for GPS aware security.

The Temperature Sensor (optional equipment) 120 allows the monitoring of environmental conditions in the device which may be detrimental to the contents. An alarm may be triggered or the temperature profile may be recorded over time for later analysis.

An Axis Accelerometer (optional equipment) 113 can be used to prevent the device from being opened while not being held at a specific angle. Can also be used to detect or record rough handling of the device. May also trigger an alarm if not handled as instructed. Can also be used where a specific set of motions is required to allow for low level authentication operations. Can also be used in multi-factor authentication where both a specific set of motions and a biometric operation are required to authenticate a given operation.

An Axis Magnetometer (optional equipment) 114 can be programmed to trigger an alarm if the device is physically moved. It also may provide a virtual lock in place function.

An Axis Gyroscope (optional equipment) may be programmed to trigger an alarm when the device is rotated in any axis at a rate greater than a fixed value.

The Display (optional equipment) 118 may take the form of a custom display 118. A custom display may be added for applications that require re complex user interaction.

The Keypad (optional equipment) 119 may be included to facilitate user interaction. A custom keypad may he added for applications that require more complex user interaction.

A Mass Storage Device (option equipment) may be within the system unit. This Mass Storage Device would allow storage and recall of sensor history data such as temperature, motion and when and where the device was opened. The mass storage device can also securely store and recall multiple user passwords. Using the (RF) link the passwords can be securely transferred to unlock user accounts, door access codes and point of sale PIN numbers using the Bluetooth Enabled Case biometric functions.

The Microphone input (optional equipment) 112 allows voice activation of various features. Developing voice recognition systems such as Alexa, Siri, and Goggle Voice among others provide high quality voice command access to multiple devices including home lights, door locks, temperature control, streaming media players among other uses. With a Bluetooth Enabled Case Lock and the cell phone connected to each other high security voice operations such as garage door operation can use the multi-device authentication of this system. In addition, the Bluetooth Enabled Case can use its limited voice recognition capabilities to control operation of the case.

Figure 9:
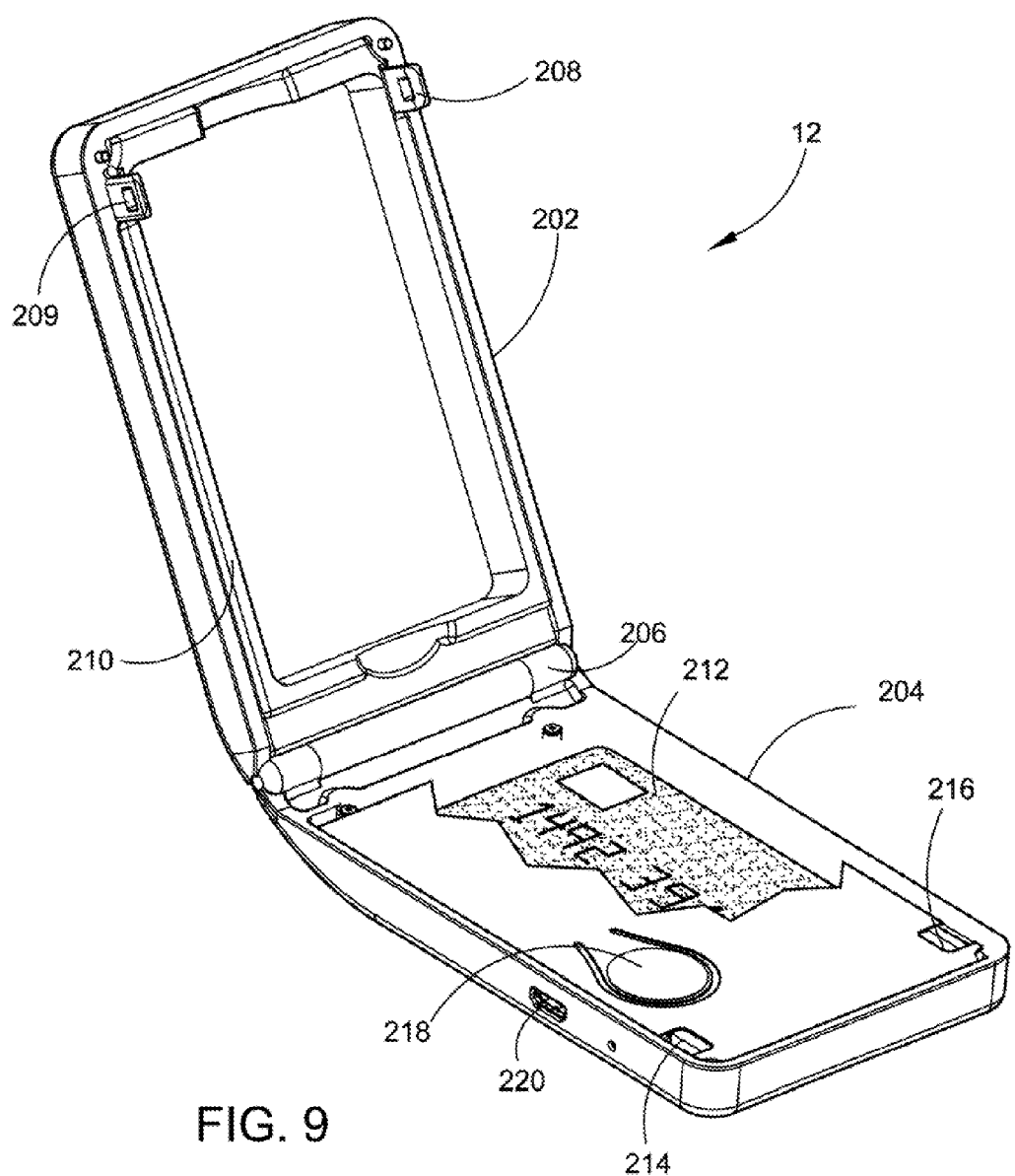
FIG. 9 depicts a perspective view of the interior of a Smartphone Controlled Biometric and Bluetooth Enabled Locking Smart Wallet System illustrating the inner compartment of the locking wallet.

Referring now to FIG. 9 there is shown a Smart Wallet 12 in the unlocked open position illustrating the various internal features. The Smart Wallet 12 upper portion 202 and lower portion 204 swing open at the resistance hinge 206 when unlocked. The upper portion 202 includes one or more locking lug tabs 208 and 209, and an LED lighted frame 210. The Smart Wallet 12 lower portion 204 includes a card storage area 212, one or more locking lug accepting slots 214 and 216, as well as an internal LED lighted Bluetooth activation button 218 to provide for Bluetooth activation once the Smart Wallet 12 is unlocked and opened using the external biometric reader mechanism or password opening steps. A USB port 220 is located on the power portion 204 of the Smart Wallet 12.

Figure 10A:
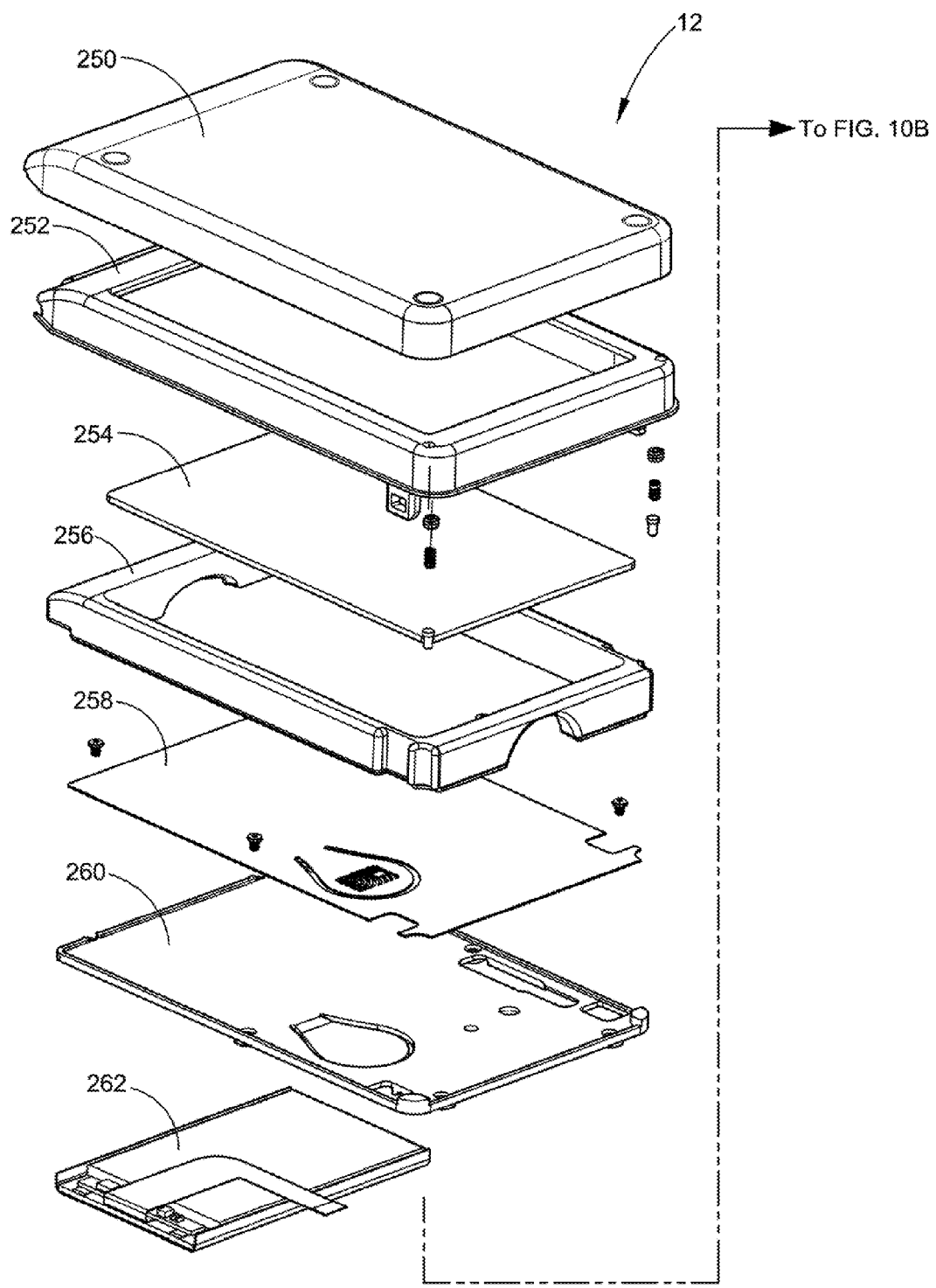
FIGS. 10A and 10B depicts the physical components which make up the construction of the Smartphone Controlled Biometric and Bluetooth Enabled Locking Smart Wallet System device.
Figure 10B:
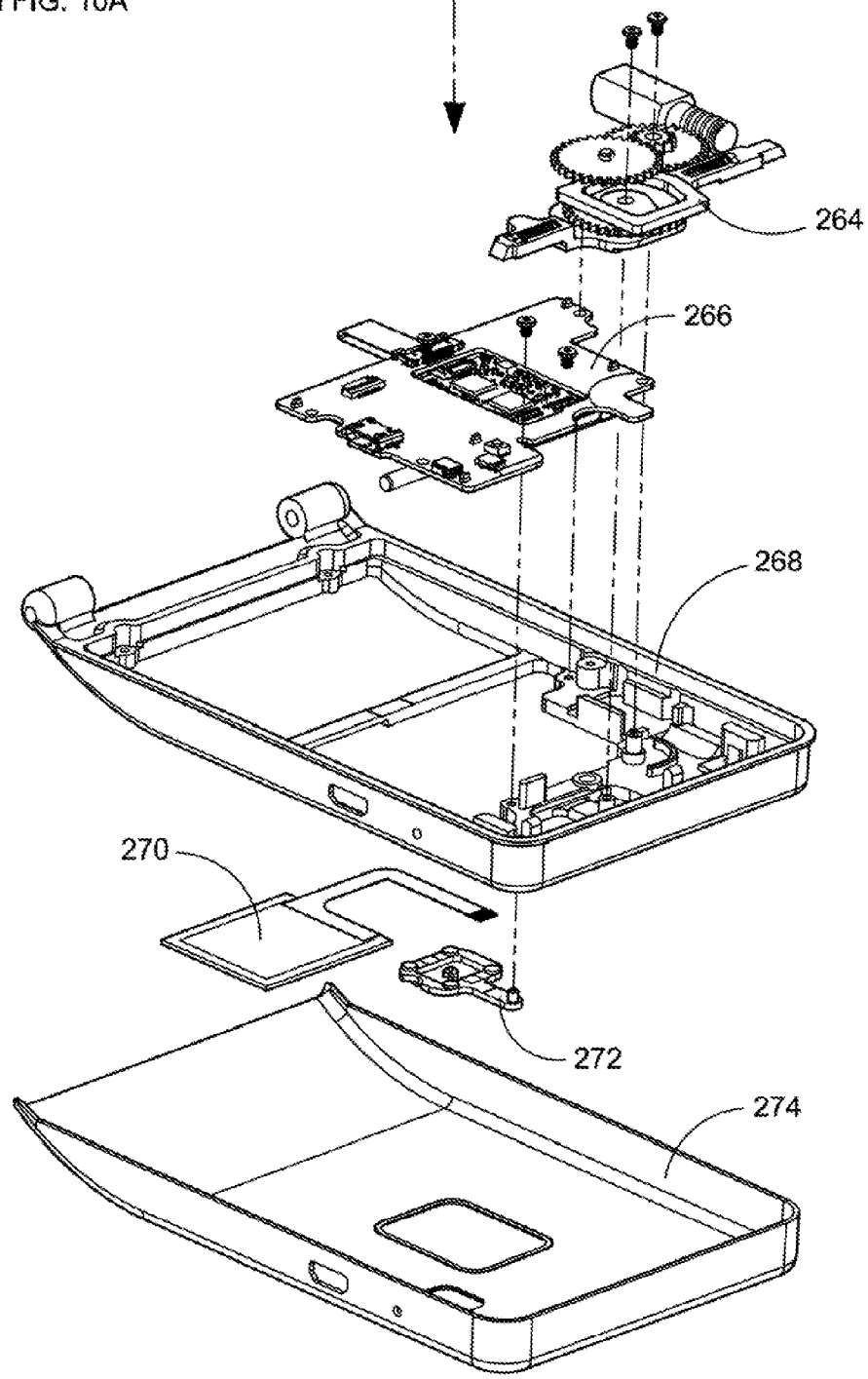

Referring now to FIGS. 10A and 10B there is shown an exploded view of the Smart Wallet 12 illustrating the various components which make up the physical construction of same. In FIG. 10A, from top to bottom, the components shown include: a bottom case 250, a lower frame member 252, a bottom foam liner 254, a molded foam inner frame member 256, and an inner liner 258 with a cut out inner Bluetooth activation button window, a PCA cover 260 and a battery 262. Moving now to FIG. 10B, from top to bottom, the physical components of the Smart Wallet 10 include: a gear assembly 264, a printed circuit board (PCB) 226, a lower frame member 268, a flex circuit speaker 270, a home button 272 and a top case member 274.

It should be noted that this smart wallet system may also take the form of a smart locking case, and that this anticipated smart locking case may be equipped similarly to the Smart Wallet 12 but be in the form of a small, medium or large locking case such as an attache case, brief case, or other form of luggage, etc. Any locking case so equipped would be controllable and controlled through the smartphone application as described and disclosed herein. Within this case locking system may be any combination of the standard and optional equipment as described above for the Smart Wallet 12 system.

Figures 11A, 11B:
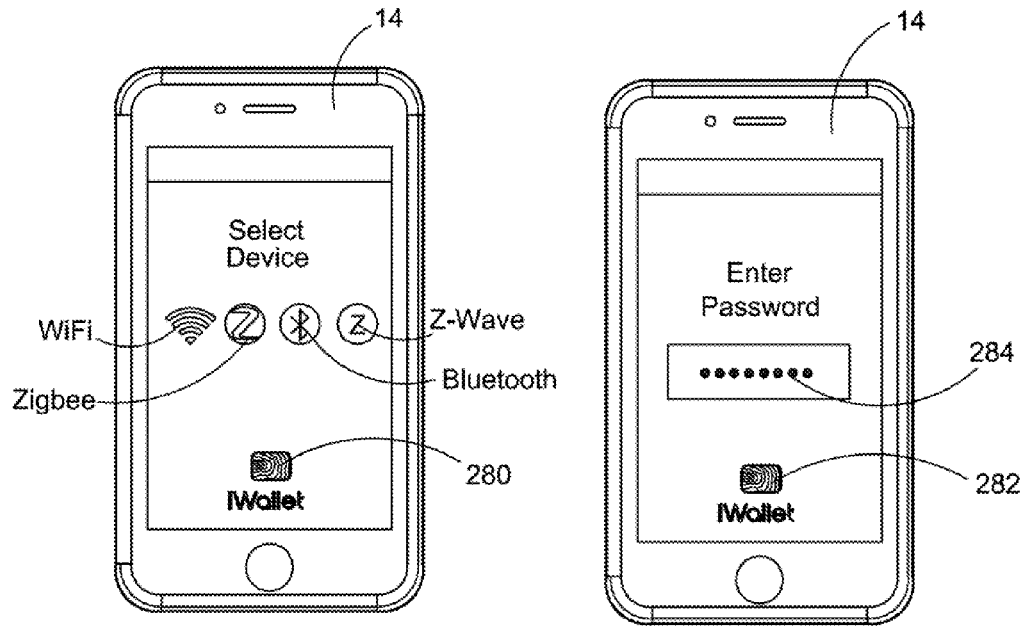
FIGS. 11A, 11B, 11C and 11D) all illustrate possible smartphone screen shots for a smartphone application which would enable control of the Smartphone Controlled Biometric and Bluetooth Enabled Locking Smart Wallet System and various devices paired with same.
Figures 11C, 11D:
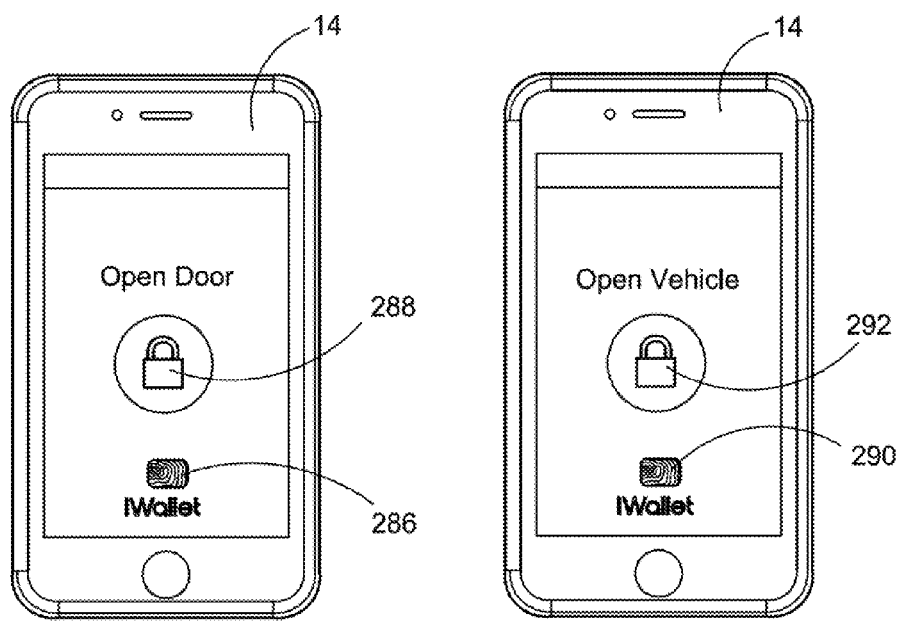

FIGS. 11A, 11B, 11C, and 11D represent smartphone screen Shots for a mobile application (app) stored on the smartphone 14 for controlling the Smart Wallet. In FIG. 11A there is shown a home screen 280 for the mobile app. On this home screen 280, the user may choose from a variety of connection options including WiFi, ZigBee, Bluetooth and Z-Wave, by pushing the corresponding button to activate that type of connection with the Smart Wallet (not shown). In FIG. 11B the next menu screen is the Enter Password screen 282 in which the user enters the appropriate password 284 for the type of connection chosen. FIG. 11C then shows a LOCK/UNLOCK screen 286, in which the user may unlock or lock a door by pushing the LOCK button 288, as accessed by the type of connection chosen in FIG. 11A. FIG. 11D shows another possible LOCK/UNLOCK screen 290 in which the user may lock or unlock a vehicle by pushing the LOCK button 292. These screen shots, and this mobile app are just examples of various means in which the Smartphone Controlled Biometric and Bluetooth Enabled Smart Wallet System 10 can be used to access, open, lock and unlock various other devices through wireless communications means.

The Biometric and Bluetooth Enabled Case Lock 10 shown in the drawings and described in detail herein disclose arrangement of elements of particular construction and configuration for illustrating preferred embodiments of structure and method of operation of the present application. It is to be understood, however, that elements of different construction and configuration and other arrangements thereof; other than those illustrated and described may be employed for providing a Case Lock 10 in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the inventing of the application, which is measured by the claims, nor is it intended to be limiting as to the scope of the invention in any way.

We claim:

1. A smartphone controlled biometric and Bluetooth enabled locking smart wallet system comprising:
    a) a smart wallet housing including a frame, incorporating a control processor and a locking latch;
    b) a biometric access input device user interface housed within said frame, for the purpose of verifying user credentials;
    c) a radio frequency (RF) communications unit housed within said frame, for the purpose of facilitating RF communications between a smartphone and said smart wallet system control processor; and
    d) a smartphone software application compatible with said smart wallet wherein the software application provides a user interface to verify a first authenticating factor including the user credentials, to lock, unlock, open and close said smart wallet locking case;
    wherein the software application requires a second authenticating factor which, is provided by the smart wallet control processor, to enable a pre-specified operation; and
    wherein access to said locking latch for locking and unlocking said smart wallet housing is controlled by said biometric access user interface and said Bluetooth RF communications unit housed within said frame.

2. The smartphone controlled biometric and Bluetooth enabled locking smart wallet system according to claim 1, wherein said RF communications unit includes a Bluetooth RF communication link for facilitating the sending of data between said smart wallet control processor and any other Bluetooth enabled device.

3. The smartphone controlled biometric and Bluetooth enabled locking smart wallet system according to claim 2, wherein said Bluetooth RF communications sent between said smart wallet housing and said biometric access input device user interface and RF communications unit includes information relating to the operational status of both the locking case and the biometric access input device user interface.

4. The smartphone controlled biometric and Bluetooth enabled locking smart wallet system according to claim 2, further including a display wherein said biometric access input device user interface and said smartphone software application use operational information shown on said display and thereby control the locking and unlocking of said smart wallet housing.

5. The smartphone controlled biometric and Bluetooth enabled locking smart wallet system according to claim 1, wherein the RF communications between the case and said biometric access input device user interface includes authentication information relating IT both the locking case and the smartphone software application.

6. The smartphone controlled biometric and Bluetooth enabled locking smart wallet system according to claim 1, wherein the biometric access input device user interface grants or denies access to security domains over which the access user interface has control.

7. The smartphone controlled biometric and Bluetooth enabled locking smart wallet system according to claim 1, wherein the biometric access input device user interface communicates with the entry access computer within A vehicle and the operations granted include unlocking the doors and activating the ignition.

8. The smartphone controlled biometric and Bluetooth enabled locking smart wallet system according to claim 1, wherein the biometric access input device user interface communicates with a building door entry access door lock and the operations granted include unlocking the door.

9. A smartphone controlled biometric and Bluetooth enabled locking smart wallet system according to claim 1, further comprising:
 an RF communications unit including a mobile computing device having a RF communication link to said smart wallet control processor, and
 further including a mobile computing device software application compatible with said smart wallet control processor; and
 further including a global positioning satellite (GPS) detection device;
 wherein the software application provides a user interface to lock, unlock, open and close said smart wallet locking latch, and said GPS detection device provides geographical location information.

10. The smartphone controlled biometric and Bluetooth enabled locking smart wallet system according to claim 9, further comprising:
 an alarm function that activates an audible alarm in the mobile computing device when the received signal strength of the RF communication unit falls below a preset level;
 an alarm function that activates an audible alarm in the locking case when the received signal strength of the RF communication unit falls below a preset level; and
 a find me function that activates an audible alarm in the locking case when a find me request command is sent from the mobile computing device software application compatible with said smart wallet locking case system.

11. The smartphone controlled biometric and Bluetooth enabled locking smart wallet system according to claim 10, further comprising:
 a find me function that activates an audible alarm in the mobile computing device when a find me request command is sent from the locking smart wallet;
 wherein a smart wallet status function displays the battery charge level of the locking smart wallet on the display of a mobile computing device; and
 further wherein a locking smart wallet status function activates an audible alarm when the battery charge level falls below a predetermined threshold;
 wherein a mobile computing device status function activates an audible alarm when locking case battery charge level falls below a predetermined threshold.

12. The smartphone controlled biometric and Bluetooth enabled locking smart wallet system according to claim 10, further comprising:

a remote open function that activates a locking case mechanism allowing the contents of the case to be accessed;
 a mobile computing device software application function which accepts as input a predetermined PIN number;
 a locking case access code generator; and
 an application code that verifies the entered PIN and generates a locking case open code after verification if the PIN;
 wherein the verified PIN access code is sent to the locking case, thereby opening the case and allowing access to the locking case contents.

13. The smartphone controlled biometric and Bluetooth enabled locking smart wallet system according to claim 1, further comprising:
 a locking smart wallet system; and
 an RF communications unit including a vehicle entry or building door entry access system including a RF communication link to a locking case, and a software application compatible with the locking smart wallet system;
 wherein the software application provides for a pre-specified vehicular operation or building access when the RF communication link signal level to the locking case is above a preset threshold.

14. The smartphone controlled biometric and Bluetooth enabled locking smart wallet system according to claim 13, further comprising:
 a biometric input device:
 further wherein the software application provides access to the vehicle when a valid fingerprint input matches the preregistered biometric input;
 the software application provides access to the vehicle when a valid voice recognition command input matches the preregistered biometric input; and
 the software application provides access to the vehicle when a valid set of rotational movements matches the preregistered movement input.

15. The smartphone controlled biometric and Bluetooth enabled locking smart wallet system according to claim 14, wherein the pre-specified vehicular operation enables door entry access, enables the vehicles ignition, and wherein the pre-specified vehicular operation unlocks an interior glove box.

16. A smartphone controlled biometric and Bluetooth enabled case locking system comprising:
 an access control lock;
 a biometric access input device user interface; and
 an RF communications unit in communication with said access control lock including an entry access door lock system including a RF communication link to a locking case, and a mobile computing device software application compatible with the locking case system;
 wherein the mobile computing device software application unlocks the door lock when the RF communication link signal level to the locking case is above a preset threshold; and
 further wherein the software application requires a second authenticating factor which, is provided by the biometric access input device user interface, to enable a pre-specified operation.

17. The smartphone controlled biometric and Bluetooth enabled case locking system according to claim 16, wherein the mobile computing device software application unlocks said access control lock when a valid fingerprint input matches the preregistered biometric input.

18. The smartphone controlled biometric and Bluetooth enabled case locking system according to claim 16, wherein the mobile computing device software application unlocks said access control lock when a valid voice command input matches the preregistered biometric input.

19. The smartphone controlled biometric and Bluetooth enabled case locking system according to claim 16, wherein the mobile computing device software application unlocks said access control lock when a valid set of rotational movements input matches the preregistered biometric input.

20. The smartphone controlled biometric and Bluetooth enabled case locking system according to claim 16, further including a GPS detection device wherein said GPS detection device provides geophysical location information.

21. The smartphone controlled biometric and Bluetooth enabled case locking system according to claim 1, further including:
   a smartphone incorporating a biometric access input device and user interface;
   wherein access to said locking latch for locking and unlocking said smart wallet housing is controlled by said biometric access input device and user interface incorporated within said smartphone.

22. The smartphone controlled biometric and Bluetooth enabled locking smart wallet system according to claim 1, wherein the access module includes the entry access computer system within an automobile, truck or bus and the operations granted include unlocking the doors and activating the ignition.

23. The smartphone controlled biometric and Bluetooth enabled locking smart wallet system according to claim 1, wherein the access module includes the entry access computer system within a boat, ship or vessel and the operations granted include unlocking the doors and activating the ignition.

24. The smartphone controlled biometric and Bluetooth enabled locking smart wallet system according to claim 1, wherein the access module includes the entry access computer system within an aircraft and the operations granted include unlocking the doors and activating the ignition.

\* \* \* \* \*